W. T. PARKIN.
TEA AND COFFEE STRAINER.
APPLICATION FILED JAN. 20, 1910.
989,403.
Patented Apr. 11, 1911.
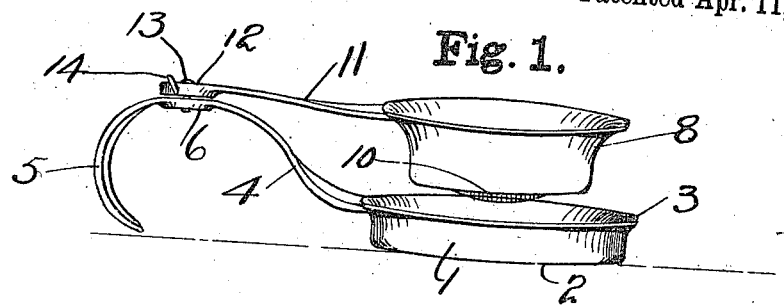
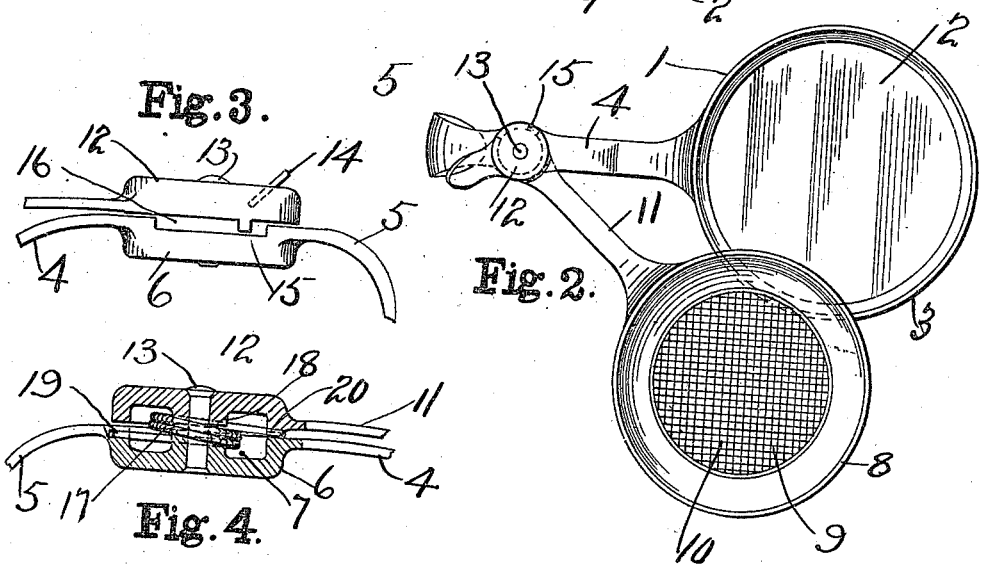
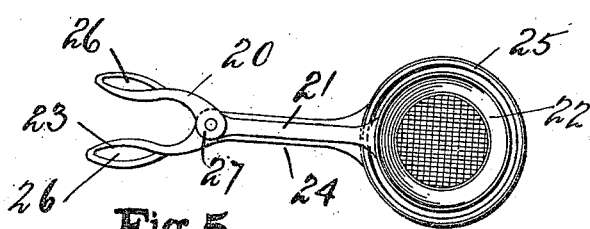
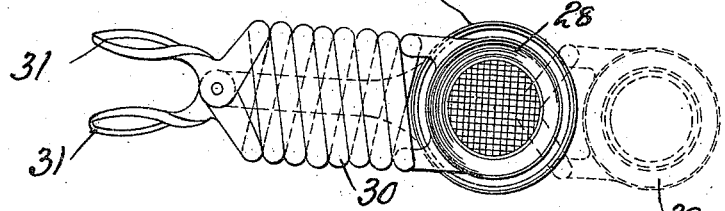
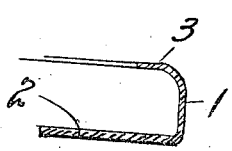
WITNESSES
Herbert L. Kelley
E. I. Ogden
INVENTOR
Winfred T. Parkin
BY
Howard E. Barlow
ATTORNEY

UNITED STATES PATENT OFFICE.

WINFRED T. PARKIN, OF PROVIDENCE, RHODE ISLAND, ASSIGNOR TO FESSENDEN AND COMPANY, INC., OF PROVIDENCE, RHODE ISLAND, A CORPORATION OF RHODE ISLAND.

TEA AND COFFEE STRAINER.

989,403.

Specification of Letters Patent.   Patented Apr. 11, 1911.

Application filed January 20, 1910. Serial No. 539,003.

*To all whom it may concern:*

Be it known that I, WINFRED T. PARKIN, a citizen of the United States, residing at the city of Providence, in the county of Providence and State of Rhode Island, have invented certain new and useful Improvements in Tea and Coffee Strainers, of which the following is a specification, reference being had therein to the accompanying drawing.

This invention relates to improvements in tea and coffee strainers of the class in which the strainer bowl is normally held above the drip cup and arranged to be moved in a horizontal plane out beyond the edge of said cup.

The object of this invention is to provide a device of this character in which the strainer bowl is arranged to be moved, preferably to swing on a pivot, to one side or beyond the edge of the drip cup for the purpose of permitting the liquid to be poured through the strainer into the receptacle beneath, after which said strainer may be returned, preferably automatically, over the cup to deposit the drip from the strainer therein.

With these and other objects in view, the invention consists of certain novel features of construction, as will be more fully described and particularly pointed out in the appended claims.

In the accompanying drawings: Figure 1— is a side elevation slightly in perspective, illustrating my improved tea and coffee strainer in its normal position. Fig. 2— is a plan view illustrating the strainer bowl as swung off to one side of the cup in position to permit the liquid to be poured therethrough. Fig. 3— is an enlarged view of the pivot casing illustrating the stop therein. Fig. 4— is a central sectional view through said pivot casing illustrating the actuating spring. Fig. 5— is a small sized plan view illustrating a modification in the arrangement of the actuating handles. Fig. 6— is a small plan view illustrating a modification by which the strainer bowl is carried directly forward beyond the edge of the drip cup by a lazy-tong movement. Fig. 7— is a section of a drip cup showing the upper edge turned inward for better retaining the liquid in the receptacle.

Referring to the drawings, 1 designates the drip receiving cup which may be made in any desired shape and of any desired material, but I preferably form this cup rather shallow with a broad flat base 2 on which to rest. The upper edge 3 of the cup may be rolled outward or made flaring, if desired, or this edge may be rolled inward, as illustrated in Fig. 7, forming an inturned lip to better retain the liquid in the cup. Extending outward on an upward curve from one side of this cup is a handle 4, the outer end of which is preferably curved downward as at 5 to the same level as the base of the cup, so that its end may rest on the table and assist in the support of said cup.

This portion 5 is conveniently formed as an extension of the handle 4, and its tip, as shown in Fig. 1, is substantially flush with the bottom or base of the cup. Since said rest portion 5 is substantially in line with the handle 4, it aids in supporting the entire device in proper position on a table because it prevents the cup from being tilted by the weight of the handle and the pivotal connections, and so much of the arm 11 as is laterally beyond or outside of the edge of the base of the drip cup on which the cup would be liable to be so tilted. One portion of this handle near its highest part is preferably enlarged as at 6, see Fig. 4, and cupped or chambered out as at 7 for the purpose of better receiving the actuating spring hereinafter described, and the center portion is provided with a hub 18 for receiving the pivot pin 13.

The strainer bowl 8 may be of any desired material and of any ornamental shape, the bottom portion 9 being either perforated or provided with a screen of wire netting 10 for the purpose of collecting and retaining any leaves, grounds or other foreign matter in the liquid as the same is poured therethrough. This bowl is provided with an arm 11 extending outward preferably from its upper edge, the outer portion of said arm being preferably formed with an inverted cup-shaped portion 12 corresponding with the similar portion 6, above described, formed in the upper side of the cup handle 4. An ear, knob or lug 14 is formed on one side of this portion 12 against which the finger of the operator may press in swinging the bowl off to one side of the cup on the pivot pin 13 which passes through both members. A stop lug or finger 15 is formed on the upper member 12, see Fig. 3, to project into an opening 16 in the outer edge of the portion 6, said lug being adapted to bring up against the wall at one end of this slot to form a limit to the outward throw of the bowl and at the opposite end of the slot to determine the central position of the bowl above the cup.

In order to insure the bowl returning as quickly as possible to its central position over the cup I have provided a coil spring 17 encircling the pivot and the central hubs 18 in the cup members 6 and 12, one end of said spring 19 engaging a slot in the member 6, while the opposite end 20 engages a corresponding slot in the edge of the member 12. The contacting edges of the two cup-shaped members 6 and 12 on the pin 13 constitute guides to direct the relative movements of the strainer and drip cup in parallel planes but out of contact with each other.

Another arrangement, illustrated in Fig. 5, shows a construction whereby the device is adapted to be held in the fingers of the operator like a pair of shears, both the handle 20, which is connected to the arm 21 of the bowl member 22, and the handle 23, which is connected to the arm 24 of the cup member 25, are provided with eyes 26 through which the fingers of the operator may be passed so that these handles may be squeezed or brought together for the purpose of swinging the bowl to one side of the cup on its pivot pin 27.

Another arrangement of my improved construction is illustrated in Fig. 6 in which the bowl 28 may be moved directly forward of the cup 29 into the dotted position, by means of the lazy-tong arrangement 30 which may be operated by squeezing together the handles 31—31. The pivot pin or the contacting faces of the overlapping or crossing portions of the arms 21, 24 shown in Fig. 5, constitute guides to direct the relative movements of the strainer and drip cup in parallel planes but out of contact with each other. And the same functions are performed by the contacting faces and pivots of the members of the lazy-tong structure shown in Fig. 6.

In the operation of my improved tea and coffee strainer the device is usually grasped by the left hand of the operator, the first finger passing through and around the hooked portion 5 of the handle which brings the thumb naturally into the correct position to engage the little ear 14, whereby a slight pressure of this ear causes the bowl to swing to the right on its pivot and carry the same in a horizontal plane off to one side of the drip cup, here the stop lug 15 limits the motion in this direction and the device is placed in position over the tea or coffee cup to permit the liquid to be poured therein through the strainer. After the cup is filled the thumb releases the little ear 14 and the bowl swings quickly under the influence of the spring 17 back to its normal position above the cup, when the operation may be repeated over another tea cup, or the device may be set down upon the table until again called into action.

The device as a whole is of very little height, and consequently is not liable to tip over or to cause any spattering of liquid. These advantages result from the fact that the movable connections between the two members are such that portions of said connections practically constitute guides which limit or direct the relative movements of the strainer and cup in different but substantially parallel planes. The strainer never has to be any higher than just enough to clear the top of the cup by a horizontal movement of one member or the other. Another advantage resulting from this construction is that the user can tell by the feeling of the device when setting it down, if it is being put on the table in proper position.

My improved device is ornamental and attractive in appearance, is simple and practical in construction, is inexpensive to manufacture and effective in its operation.

The device is not restricted to the moving of the strainer bowl from over the cup, as this bowl may be itself retained and the cup moved from beneath it, in either case the movement is but relative, neither do I wish to be restricted to a swinging or pivoted movement of one of these members to or beyond the edge of the other, as any means for relatively moving either of these members substantially in a horizontal plane would fall within the spirit and scope of my invention.

In each form or embodiment of the invention illustrated, the connection between the drip cup and the strainer which determines the direction in which the strainer shall be swung, is a pivot or stud the axis of which is transverse of the plane of the base. The base of course, in use, stands in a horizontal plane. In Figs. 1, 2, 3 and 4 the pin 13 constitutes a substantially vertical stud. In Fig. 5 the pin 27 constitutes a substantially vertical stud, and in Fig. 6 the pivot nearest to the handles 31—31 is also a vertical stud. In every case, the pivot pin or stud which controls the direction of relative motion of the cup and strainer has its axis transverse of the plane of the base.

Having thus described my invention, what I claim as new and desire to secure by Letters Patent, is:

1. A tea and coffee strainer comprising a drip cup having a supporting base and a laterally extended handle, a strainer, means for supporting the strainer above the plane of said cup, means whereby the strainer may be moved horizontally, and a rest at one side of the cup substantially in line with the handle to prevent the cup from being tilted by the weight of the handle.

2. A tea and coffee strainer comprising a drip cup having a supporting base and a raised handle, a strainer provided with a supporting arm, means for pivotally connecting said arm to the raised portion of said handle to support the strainer in spaced relation to said drip cup, and means whereby the strainer may be moved horizontally.

3. A tea and coffee strainer comprising a drip cup having a supporting base and a raised handle, a strainer provided with a supporting arm, and means for pivotally connecting said arm to the raised portion of said handle to support the strainer in spaced relation with said drip cup, said arm being provided with a lug whereby said strainer may be moved horizontally.

4. A tea and coffee strainer comprising a drip cup having a supporting base and a laterally extended handle provided with a raised portion having a stud arranged transversely of the plane of said base, a strainer provided with an arm supported by said stud, and means whereby the strainer may be moved horizontally.

5. A tea and coffee strainer comprising a drip cup having a handle formed with a cup-shaped enlargement, a strainer having a handle formed with an inverted cup-shaped enlargement, a pivot connecting said two enlargements, and a spring located in the space provided between the enlargements, one of said enlargements having its edge formed with an elongated recess, the other enlargement having a lug entering said recess.

In testimony whereof I affix my signature in presence of two witnesses.

WINFRED T. PARKIN.

Witnesses:
E. I. OGDEN,
HOWARD E. BARLOW.

Copies of this patent may be obtained for five cents each, by addressing the "Commissioner of Patents, Washington, D. C."